United States Patent
Li (10) Patent No.: US 11,301,173 B2
(45) Date of Patent: Apr. 12, 2022

(54) METHOD AND SYSTEM FOR FACILITATING EVALUATION OF DATA ACCESS FREQUENCY AND ALLOCATION OF STORAGE DEVICE RESOURCES

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/853,467

(22) Filed: Apr. 20, 2020

(65) Prior Publication Data

US 2021/0326067 A1  Oct. 21, 2021

(51) Int. Cl.
*G06F 3/06* (2006.01)
*G06F 12/1009* (2016.01)

(52) U.S. Cl.
CPC .......... *G06F 3/0659* (2013.01); *G06F 3/0604* (2013.01); *G06F 3/064* (2013.01); *G06F 3/0679* (2013.01); *G06F 12/1009* (2013.01); *G06F 2212/657* (2013.01)

(58) Field of Classification Search
CPC ....... G06F 3/0604; G06F 3/0679; G06F 3/064
See application file for complete search history.

(56) References Cited

U.S. PATENT DOCUMENTS

| 5,715,471 | A  | 2/1998 | Otsuka |
| 7,351,072 | B2 | 4/2008 | Muff |
| 8,527,544 | B1 | 9/2013 | Colgrove |
| 8,819,367 | B1 | 8/2014 | Fallone |
| 8,832,688 | B2 | 9/2014 | Tang |
| 9,031,296 | B2 | 5/2015 | Kaempfer |
| 9,213,627 | B2 | 12/2015 | Van Acht |
| 9,495,263 | B2 | 11/2016 | Pang |
| 9,529,670 | B2 | 12/2016 | O'Connor |
| 9,575,982 | B1 | 2/2017 | Sankara Subramanian |
| 9,607,631 | B2 | 3/2017 | Rausch |
| 9,671,971 | B2 | 6/2017 | Trika |
| 9,852,076 | B1 | 12/2017 | Garg |
| 9,912,530 | B2 | 3/2018 | Singatwaria |
| 9,946,596 | B2 | 4/2018 | Hashimoto |
| 10,268,390 | B2 | 4/2019 | Warfield |
| 10,361,722 | B2 | 7/2019 | Lee |
| 10,459,663 | B2 | 10/2019 | Agombar |
| 10,642,522 | B2 | 5/2020 | Li |

(Continued)

OTHER PUBLICATIONS

C. Wu, D. Wu, H. Chou and C. Cheng, "Rethink the Design of Flash Translation Layers in a Component-Based View", in IEEE Acess, vol. 5, p. 12895-12912, 2017.

(Continued)

*Primary Examiner* — David Yi
*Assistant Examiner* — Nicholas A. Paperno
(74) *Attorney, Agent, or Firm* — Shun Yao; Yao Legal Services, Inc.

(57) ABSTRACT

A system is provided to receive a request to write data to a non-volatile memory, wherein the data is associated with a logical block address. The system classifies the data into a category based on an access frequency corresponding to the logical block address, and assigns the data to a channel based on the classified category. The system writes the data to the non-volatile memory via the assigned channel.

19 Claims, 9 Drawing Sheets

(56) References Cited

U.S. PATENT DOCUMENTS

| | | |
|---|---|---|
| 10,649,657 B2 | 5/2020 | Zaidman |
| 10,678,432 B1 | 6/2020 | Dreier |
| 10,756,816 B1 | 8/2020 | Dreier |
| 10,928,847 B2 | 2/2021 | Suresh |
| 2002/0112085 A1 | 8/2002 | Berg |
| 2004/0267752 A1 | 12/2004 | Wong |
| 2005/0138325 A1 | 6/2005 | Hofstee |
| 2005/0144358 A1 | 6/2005 | Conley |
| 2006/0101197 A1 | 5/2006 | Georgis |
| 2006/0184813 A1 | 8/2006 | Bui |
| 2007/0250756 A1 | 10/2007 | Gower |
| 2007/0266011 A1 | 11/2007 | Rohrs |
| 2007/0283104 A1 | 12/2007 | Wellwood |
| 2008/0065805 A1 | 3/2008 | Wu |
| 2008/0082731 A1 | 4/2008 | Karamcheti |
| 2008/0163033 A1 | 7/2008 | Yim |
| 2009/0006667 A1 | 1/2009 | Lin |
| 2009/0125788 A1 | 5/2009 | Wheeler |
| 2009/0183052 A1 | 7/2009 | Kanno |
| 2009/0254705 A1 | 10/2009 | Abali |
| 2009/0307426 A1 | 12/2009 | Galloway |
| 2011/0031546 A1 | 2/2011 | Uenaka |
| 2011/0060722 A1 | 3/2011 | Li |
| 2011/0239083 A1 | 9/2011 | Kanno |
| 2011/0252188 A1 | 10/2011 | Weingarten |
| 2011/0289263 A1 | 11/2011 | McWilliams |
| 2011/0289280 A1 | 11/2011 | Koseki |
| 2011/0296411 A1 | 12/2011 | Tang |
| 2012/0017037 A1 | 1/2012 | Riddle |
| 2012/0203958 A1 | 8/2012 | Jones |
| 2012/0324312 A1 | 12/2012 | Moyer |
| 2012/0331207 A1 | 12/2012 | Lassa |
| 2013/0024605 A1 | 1/2013 | Sharon |
| 2013/0205183 A1 | 8/2013 | Fillingim |
| 2013/0254622 A1 | 9/2013 | Kanno |
| 2013/0329492 A1 | 12/2013 | Yang |
| 2014/0095769 A1 | 4/2014 | Borkenhagen |
| 2014/0108891 A1 | 4/2014 | Strasser |
| 2014/0164447 A1 | 6/2014 | Tarafdar |
| 2014/0164879 A1 | 6/2014 | Tam |
| 2014/0215129 A1 | 7/2014 | Kuzmin |
| 2015/0143030 A1 | 5/2015 | Gorobets |
| 2015/0199234 A1 | 7/2015 | Choi |
| 2015/0286477 A1 | 10/2015 | Mathur |
| 2015/0310916 A1 | 10/2015 | Leem |
| 2015/0317095 A1 | 11/2015 | Voigt |
| 2015/0363328 A1 | 12/2015 | Candelaria |
| 2016/0054922 A1 | 2/2016 | Awasthi |
| 2016/0062885 A1 | 3/2016 | Ryu |
| 2016/0077749 A1 | 3/2016 | Ravimohan |
| 2016/0077764 A1 | 3/2016 | Ori |
| 2016/0103631 A1 | 4/2016 | Ke |
| 2016/0132237 A1 | 5/2016 | Jeong |
| 2016/0155750 A1 | 6/2016 | Yasuda |
| 2016/0224267 A1 | 8/2016 | Yang |
| 2016/0234297 A1 | 8/2016 | Ambach |
| 2016/0306699 A1 | 10/2016 | Resch |
| 2016/0321002 A1 | 11/2016 | Jung |
| 2016/0335085 A1 | 11/2016 | Scalabrino |
| 2017/0004037 A1 | 1/2017 | Park |
| 2017/0185498 A1 | 6/2017 | Gao |
| 2017/0192848 A1 | 7/2017 | Pamies-Juarez |
| 2017/0199823 A1 | 7/2017 | Hayes |
| 2017/0235609 A1* | 8/2017 | Wires ............... G06F 16/11 718/104 |
| 2017/0242722 A1 | 8/2017 | Qiu |
| 2017/0269998 A1 | 9/2017 | Jung |
| 2017/0279460 A1 | 9/2017 | Camp |
| 2017/0322888 A1 | 11/2017 | Booth |
| 2018/0067847 A1 | 3/2018 | Oh |
| 2018/0069658 A1 | 3/2018 | Benisty |
| 2018/0074730 A1 | 3/2018 | Inoue |
| 2018/0076828 A1 | 3/2018 | Kanno |
| 2018/0113631 A1 | 4/2018 | Zhang |
| 2018/0113642 A1* | 4/2018 | Huen ............... G06F 3/0635 |
| 2018/0165038 A1 | 6/2018 | Authement |
| 2018/0165169 A1* | 6/2018 | Camp ............... G06F 11/2069 |
| 2018/0165340 A1 | 6/2018 | Agarwal |
| 2018/0173620 A1 | 6/2018 | Cen |
| 2018/0188970 A1 | 7/2018 | Liu |
| 2018/0189175 A1 | 7/2018 | Ji |
| 2018/0219561 A1 | 8/2018 | Litsyn |
| 2018/0226124 A1 | 8/2018 | Perner |
| 2018/0307598 A1* | 10/2018 | Fischer ............ G06F 12/0253 |
| 2018/0321864 A1 | 11/2018 | Benisty |
| 2018/0322024 A1 | 11/2018 | Nagao |
| 2018/0357126 A1 | 12/2018 | Dhuse |
| 2018/0373664 A1 | 12/2018 | Krishna |
| 2019/0050327 A1 | 2/2019 | Li |
| 2019/0065085 A1 | 2/2019 | Jean |
| 2019/0073261 A1 | 3/2019 | Halbert |
| 2019/0087089 A1 | 3/2019 | Yoshida |
| 2019/0087115 A1 | 3/2019 | Li |
| 2019/0087328 A1 | 3/2019 | Kanno |
| 2019/0116127 A1 | 4/2019 | Pismenny |
| 2019/0172820 A1 | 6/2019 | Meyers |
| 2019/0196907 A1 | 6/2019 | Khan |
| 2019/0212949 A1 | 7/2019 | Pletka |
| 2019/0220392 A1 | 7/2019 | Lin |
| 2019/0272242 A1 | 9/2019 | Kachare |
| 2019/0278654 A1 | 9/2019 | Kaynak |
| 2019/0317901 A1 | 10/2019 | Kachare |
| 2020/0013458 A1 | 1/2020 | Schreck |
| 2020/0026657 A1* | 1/2020 | Franke ............ G06F 12/1036 |
| 2020/0042223 A1 | 2/2020 | Li |
| 2020/0042387 A1 | 2/2020 | Shani |
| 2020/0089430 A1 | 3/2020 | Kanno |
| 2020/0143885 A1 | 5/2020 | Kim |
| 2020/0159425 A1 | 5/2020 | Flynn |
| 2020/0167091 A1 | 5/2020 | Haridas |
| 2020/0250032 A1 | 8/2020 | Goyal |
| 2020/0257598 A1 | 8/2020 | Yazovitsky |
| 2020/0326855 A1 | 10/2020 | Wu |
| 2020/0328192 A1 | 10/2020 | Zaman |
| 2020/0348888 A1 | 11/2020 | Kim |
| 2020/0401334 A1 | 12/2020 | Saxena |
| 2020/0409791 A1 | 12/2020 | Devriendt |
| 2021/0089392 A1 | 3/2021 | Shirakawa |

OTHER PUBLICATIONS

Po-Liang Wu, Yuan-Hao Chang and T. Kuo, "A file-system-aware FTL design for flash-memory storage systems," 2009, pp. 393-398.

S. Choudhuri and T. Givargis, "Preformance improvement of block based NAND flash translation layer", 2007 5th IEEE/ACM/IFIP International Conference on Hardware/Software Codesign and Systems Synthesis (CODES+ISSS). Saizburg, 2007, pp. 257-262.

A. Zuck, O. Kishon and S. Toledo. "LSDM: Improving the Preformance of Mobile Storage with a Log-Structured Address Remapping Device Driver", 2014 Eighth International Conference on Next Generation Mobile Apps, Services and Technologies, Oxford, 2014, pp. 221-228.

J. Jung and Y. Won, "nvramdisk: A Transactional Block Device Driver for Non-Volatile RAM", in IEEE Transactions on Computers, vol. 65, No. 2, pp. 589-600, Feb. 1, 2016.

Te I et al. (Pensieve: a Machine Assisted SSD Layer for Extending the Lifetime: (Year: 2018).

ARM ("Cortex-R5 and Cortex-R5F", Technical reference Manual, Revision r1p1) (Year:2011).

* cited by examiner

|  | LBA 302 | PBA 304 | STREAM ID 306 | COUNTER 308 |
|---|---|---|---|---|
| 310 | LBA_0 312 | PBA_x 314 | ID_4 316 | <...> |
| 320 | LBA_1 322 | PBA_z 324 | ID_1 326 | 2 |
| 330 | LBA_2 332 | PBA_z 334 | ID_2 336 | <...> |
|  | ... | ... | ... | ... |
| 340 | LBA_i-1 342 | PBA_u 344 | ID_5 346 | 32 |
| 350 | LBA_i 352 | PBA_s 354 | ID_3 356 | 121 |
|  | ... | ... | ... | ... |
| 360 | LBA_n-1 362 | PBA_y 364 | ID_1 366 | 3 |
| 370 | LBA_n 372 | PBA_w 374 | ID_1 376 | 1 |

METHOD AND SYSTEM FOR FACILITATING EVALUATION OF DATA ACCESS FREQUENCY AND ALLOCATION OF STORAGE DEVICE RESOURCES

BACKGROUND

Field

This disclosure is generally related to the field of data storage. More specifically, this disclosure is related to a method and system for facilitating evaluation of data access frequency and allocation of storage device resources.

Related Art

Today, various storage systems are being used to store and access the ever-increasing amount of digital content. A storage system can include storage servers with one or more storage devices or drives, and a storage device or drive can include storage media with a non-volatile memory. A solid state drive (SSD) is a type of storage drive and can include Not-AND (NAND) flash memory as the non-volatile memory. In order to program NAND flash, the system must perform an erase operation, as NAND flash does not support in-place updates. Erasing the NAND flash is generally performed by erasing multiple blocks at the same time. Programming NAND flash is generally performed by writing multiple physical pages at the same time, while file system updates to existing data are generally performed at an even finer granularity, e.g., 4 KB logical block. Thus, in order to update a single logical block of data, the storage drive marks the prior version of the data as invalid (e.g., ready to be recycled in a garbage collection operation) and writes the updated data to an available location.

During a subsequent recycling or garbage collection procedure, the storage drive identifies a block to be recycled, copies out valid pages from the identified block, and erases the identified block. Copying out the valid pages and erasing the identified block can consume a significant amount of SSD resources, including performance, time, and lifespan. As applications and enterprise services continue to demand consistent performance from SSDs with minimal fluctuation, frequently written data can decrease the efficiency of the SSD. Thus, handling frequently updated small chunks of data while ensuring the performance and efficiency of an SSD and an overall storage system remains a challenge.

SUMMARY

One embodiment provides a system which facilitates operation of a storage system. A system is provided to receive a request to write data to a non-volatile memory, wherein the data is associated with a logical block address. The system classifies the data into a category based on an access frequency corresponding to the logical block address, and assigns the data to a channel based on the classified category. The system writes the data to the non-volatile memory via the assigned channel.

In some embodiments, prior to classifying the data, the system increments, in an entry of a mapping table, a counter which indicates a number of times that the data is accessed. The entry corresponds to the logical block address, and classifying the data into the category is further based on a current value of the counter.

In some embodiments, the entry in the mapping table indicates one or more of: the logical block address; a physical block address corresponding to the logical block address; a stream identifier corresponding to the category; and the counter which indicates the number of times that the entry is accessed.

In some embodiments, a plurality of entries in the mapping table include a same stream identifier, the entries which include the same stream identifier are associated with a sub-region of the non-volatile memory, and the sub-region is accessed via one or more channels in the non-volatile memory.

In some embodiments, the system assigns the data to the channel based on the classified category by assigning the data to the stream identifier. The system assigns other data corresponding to the same stream identifier to the sub-region of the non-volatile memory, and assigns the sub-region to the one or more channels in the non-volatile memory.

In some embodiments, the system classifies the data into the category based on the access frequency further based on: comparing the counter to a predetermined first number of times that the data is accessed within a first predetermined time interval or time period.

In some embodiments, the system increments the counter which indicates the number of times that the entry is accessed is based on one or more of: reading the data; and writing an update to the data.

In some embodiments, the classified category for the data is one of a plurality of categories, and a respective category is associated with one of a plurality of predetermined access frequencies.

In some embodiments, the system updates the assigned channel responsive to adjusting a distribution of channels in the non-volatile memory among the plurality of categories based on one or more of: an amount of data associated with a respective channel or the channels; an amount of throughput available on the respective channel or the channels; and an amount of throughput required by data currently assigned to one or more channels.

In some embodiments, the system adjusts the distribution of channels in the non-volatile memory among the plurality of categories by updating a first configuration of channels to a second configuration of channels. The first configuration of channels indicates an assignment of a first set of one or more channels to a first category, and the second configuration of channels indicates an assignment of a second set of one or more channels to the first category. The first set and the second set differ by at least one channel.

In some embodiments, the request is received from a host or is triggered by a background operation.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein facilitate a system for classifying data based on access frequency with an improved accuracy and in a more time-efficient manner at the driver level. The system can thus provide a real-time allocation of storage resources based on dynamically gathered online statistics to optimize the potential of a storage device.

As described herein, erasing NAND flash is generally performed by erasing multiple blocks at the same time. Programming NAND flash is generally performed by writing multiple physical pages at the same time, while file system updates to existing data are generally performed at an even finer granularity, e.g., 4 KB logical block. Thus, in order to update a single logical block of data, the storage device marks the prior version of the data as invalid (e.g., ready to be recycled in a garbage collection operation) and writes the updated data to an available location.

During a subsequent recycling or garbage collection procedure, the storage device identifies a block to be recycled, copies out valid pages from the identified block, and erases the identified block. Copying out the valid pages and erasing the identified block can consume a significant amount of SSD resources, including performance, time, and lifespan. As applications and enterprise services continue to demand consistent performance from SSDs with minimal fluctuation, frequently written data can decrease the efficiency of the SSD. Thus, handling frequently updated small chunks of data while ensuring the performance and efficiency of an SSD and an overall storage system remains a challenge.

One current technique for addressing this challenge is to use a multi-stream SSD, in which the host separates streams based on a host-assigned stream tag or stream identifier based on a frequency of updates. The SSD isolates multiple physical regions to store incoming streams. This assumes that each host stream includes data with a similar update frequency. However, the host-assigned stream tag cannot represent the actual update frequency in an accurate or timely manner, and is thus limited by the following constraints: the host stream-tagging system has no visibility into whether a write operation is a host write or a background operation of the storage device; the host application cannot maintain a write operation with the same characteristics in the same stream, as file updates may change over time, rendering the initial stream separation both inaccurate and untimely; and the system binds a given stream to an isolated physical region of the NAND flash, where the fixed size of the physical region can depend on the size of the buffer and the availability of power loss protection. An exemplary single-stream SSD and an exemplary multi-stream SSD are described below in relation to, respectively, FIGS. 1A and 1B.

The embodiments described herein address these limitations by providing a system with a statistics-updating module and a frequency-sorting module in a driver of a storage device. An exemplary driver is described below in relation to FIG. 2. The system can monitor and update access statistics for data based on an associated logical block address (LBA) for the data. In a mapping table (e.g., as maintained by a flash translation layer (FTL)), the system can create an entry for the data, which can include: the LBA; the physical block address; a stream identifier; and a counter which indicates a number of times that the data is accessed. An exemplary mapping table is described below in relation to FIG. 3. The system can increment the counter for a respective LBA, and can classify the data into a category associated with a predetermined access frequency (e.g., a "hotness group") based on the counter. Multiple entries can be assigned to a same stream identifier based on their respective classified category. The system can assign a set of physical channels to a respective category (which can include multiple entries corresponding to the same stream identifier).

Furthermore, the system can dynamically adjust the distribution of physical channels to categories based on an amount of data associated with a respective channel or channels as well as an amount of throughput available in a respective channel or channels. An example of adjusting the distribution of physical channels to categories is described below in relation to FIG. 4.

Thus, by dynamically monitoring and updating the access statistics of data, the embodiments described herein can classify the data with improved accuracy, and can also provide a real-time allocation of storage resources based on these dynamically updated online statistics. These improvements can result in a more efficient storage device and overall storage system.

A "storage system infrastructure," "storage infrastructure," or "storage system" refers to the overall set of hardware and software components used to facilitate storage for a system. A storage system can include multiple clusters of storage servers and other servers. A "storage server" refers to a computing device which can include multiple storage devices or storage drives. A "storage device" or a "storage drive" refers to a device or a drive with a non-volatile memory which can provide persistent storage of data, e.g., a solid state drive (SSD), a hard disk drive (HDD), or a flash-based storage device.

A "computing device" refers to any server, device, node, entity, drive, or any other entity which can provide any computing capabilities.

A "category" or "hotness group" refers to a group of data which is classified in a respective category based on a similar access frequency, e.g., data classified in a certain category is associated with a particular or predetermined access frequency between a first and a second predetermined threshold. Example of categories can include hot data, warm data, and cold data. Additional categories may also be used.

The term "access frequency of data" refers to a number of times that data is accessed over a certain predetermined time interval or time period. Data can be accessed as part of a read or a write operation.

Figure 1A:
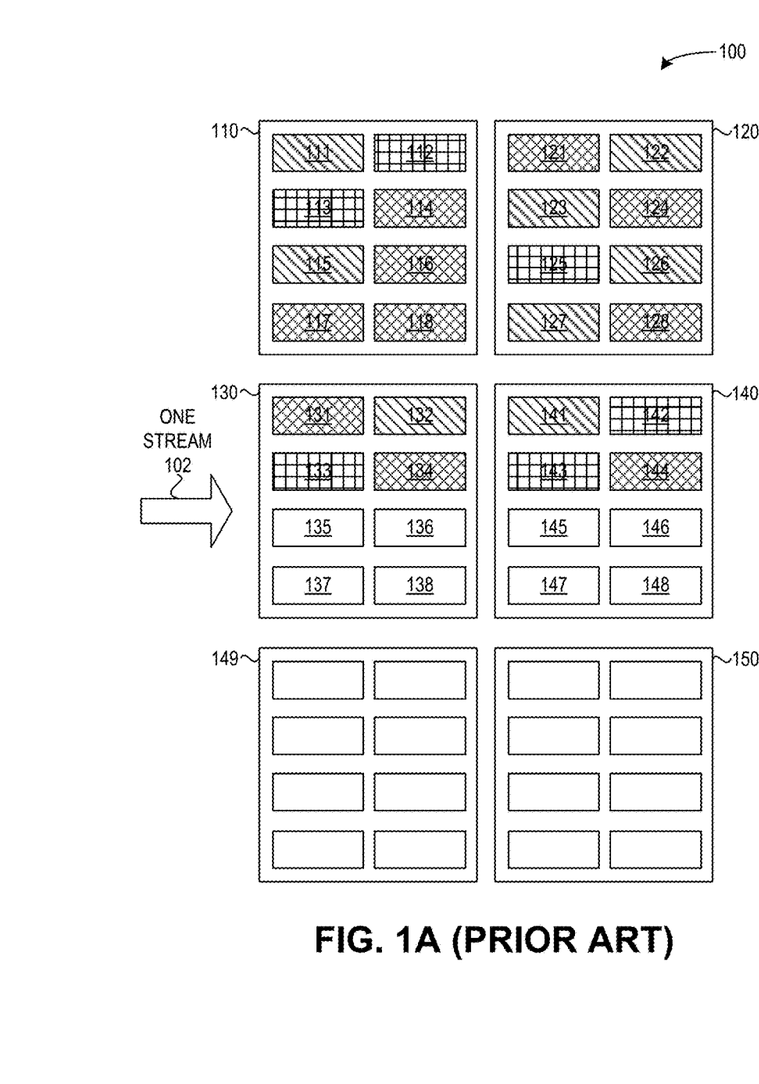
FIG. 1A illustrates an exemplary storage system which facilitates a single stream for incoming data, in accordance with the prior art.

Exemplary Operation of Storage Systems in the Prior Art: Single Stream and Multi-Stream One prior art system for storing data is a single-stream SSD. FIG. 1A illustrates an exemplary storage system 100 which facilitates a single stream for incoming data, in accordance with the prior art. Storage system 100 can include physical storage media units, such as NAND dies 110, 120, 130, 140, 149, and 150. Each NAND die can store data in units, e.g., as block or pages. For example: die 110 can store pages 111-118; die 120 can store pages 121-128; die 130 can store pages 131-138; and die 140 can store pages 141-148. Data in these pages are indicated as filled in with a certain pattern which corresponds to an access frequency for the data. Pages indicated as filled in with a diagonal cross-hatch pattern (e.g., 114, 116, 117, 118, 121, 124, 128, 131, 134, and 144) can correspond to "cold" data. Pages indicated as filled in with a left-slanting line (e.g., 111, 115, 122, 123, 126, 127, 132, and 141) can correspond to "warm" data. Pages indicated as filled in with a perpendicular cross-hatch pattern (e.g., 112, 113, 125, 133, 142, and 143) can correspond to "hot data."

Data can be received by the physical storage media as a single stream, i.e., one stream 102, and placed in the NAND dies based on the order in which they arrive. Storage system 100 may not necessarily monitor the access frequency of the data. The different patterns corresponding to the access frequency of the data are depicted to clarify how the single-stream method results in data with varying access frequency spread out across the physical storage media.

Figure 1B:
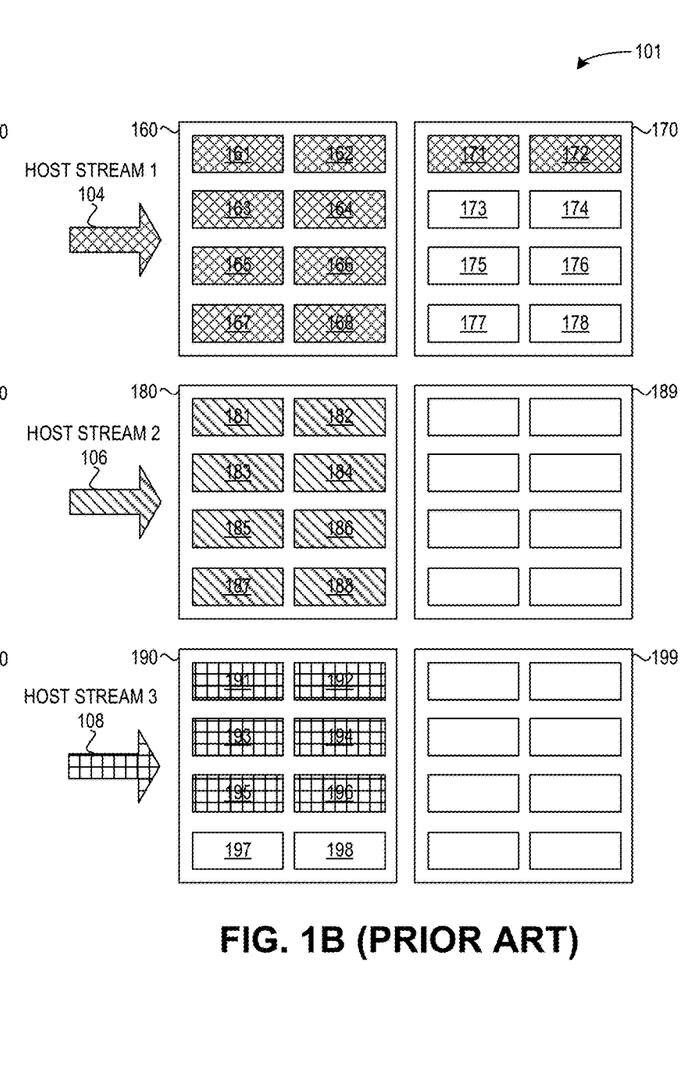
FIG. 1B illustrates an exemplary storage system which facilitates multiple streams for incoming data, in accordance with the prior art.

Another prior art system for storing data is a multi-stream SSD, which can provide improvements to storage system 100 of FIG. 1. FIG. 1B illustrates an exemplary storage system 101 which facilitates multiple streams for incoming data, in accordance with the prior art. Storage system 101 can include physical storage media units, such as NAND dies 160, 170, 180, 189, 190, and 199. Each NAND die can store data in units, e.g., as block or pages. For example: die 160 can store pages 161-168; die 170 can store pages 171-178; die 180 can store pages 181-188; and die 190 can store pages 191-198. Data in these pages are indicated as filled in with a certain pattern which corresponds to an access frequency for the data. The patterns in the pages of storage system 101 correspond to data of the same access frequency as in storage system 101. That is, a diagonal cross-hatch pattern can correspond to cold data (e.g., 161-168 and 171-172), a left-slanting line pattern can correspond to warm data (e.g., 181-188), and a perpendicular cross-hatch pattern can correspond to hot data (191-196).

Data can be received by the physical storage media of storage system 101 as multiple streams, where each stream can correspond to data from a specific application and be placed in an assigned NAND die. One presumption is that each host stream includes data of a very similar access frequency. The system thus assigns all data from a single host stream to a certain region associated with a given access frequency. For example, a host stream 1 104 can correspond to cold data from a first application, and thus all the data from host stream 1 104 is placed into dies 160 and 170. A host stream 2 106 can correspond to warm data from a second application, and thus all the data from host stream 1 104 is placed into die 180. A host stream 3 108 can correspond to hot data from a third application, and thus all the data from host stream 3 106 is placed into die 190.

Thus, storage system 101 isolates multiple physical regions to store incoming streams, e.g., based on a host stream identifier. While this physical isolation may work (or result in too many inefficiencies) in a system in which each host stream consistently and constantly includes data with a similar update frequency, in practice this assumption may not be true. The host stream identifier cannot represent the actual update frequency is an accurate or timely manner, and is thus limited by several constraints.

First, data is written to the NAND flash based on both write requests received from the host ("host-writes") and internal background operations of the device (e.g., garbage collection, wear-leveling, data retention, and read disturb). The host system which generates and manages the host stream identifiers lacks knowledge regarding the background write operations of the device, and thus has no visibility into whether a write operation is a host write or a background operation of the storage device.

Second, the host application (including a cloud service provider) cannot maintain a write operation with the same characteristics in the same stream, as file updates may change over time. This can render the initial stream separation both inaccurate and untimely.

Third, the system binds a given stream to an isolated physical region of the NAND flash, which thus limits the system to the physical regions of the device. The region size can depend on the size of the buffer and the availability of power loss protection, which are further limitations to the isolated physical regions of the device.

Thus, all of these constraints can limit the flexibility and performance of the overall storage system.

Figure 2:
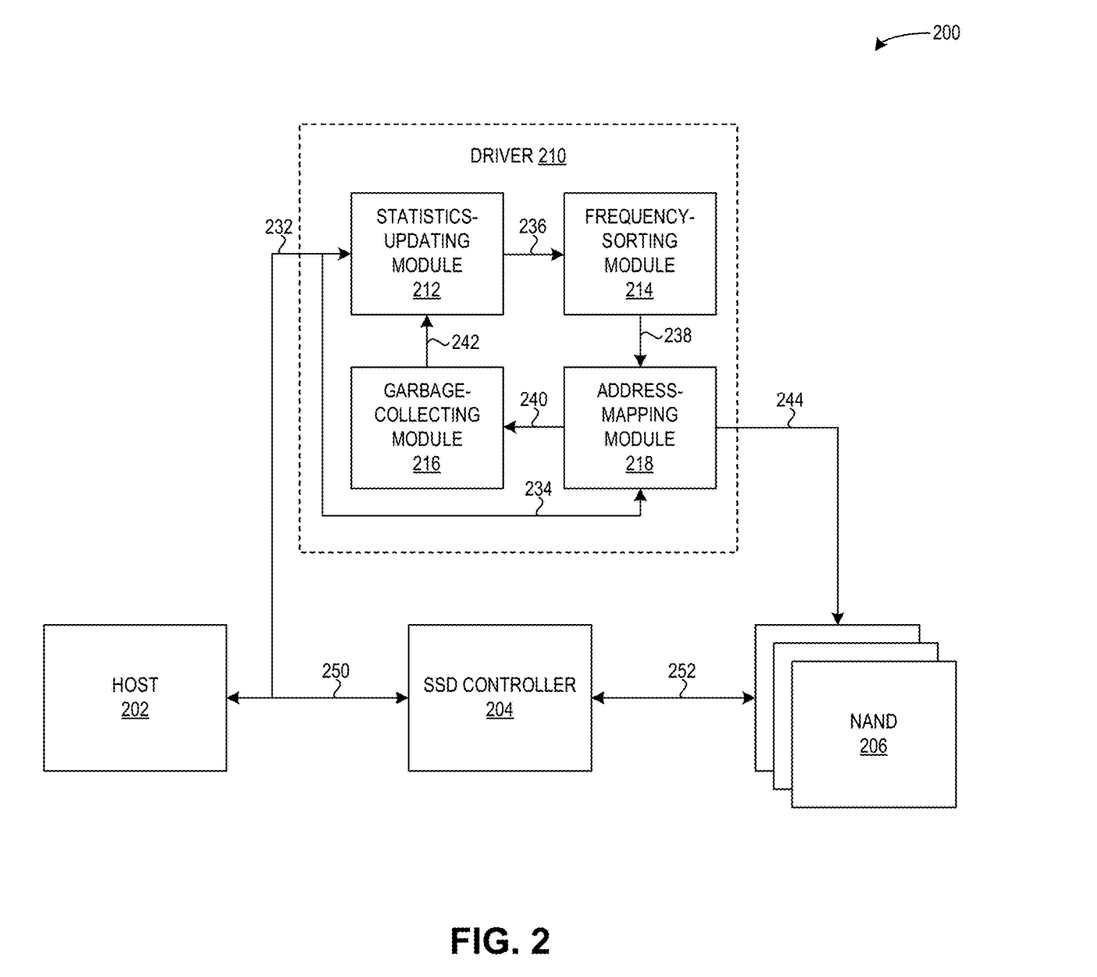
FIG. 2 illustrates an exemplary environment for facilitating operation of a storage system, including a driver with a statistics-updating module and a frequency-sorting module, in accordance with an embodiment of the present application.

Exemplary Environment, Including Driver with Statistics-Updating Module and Frequency-Sorting Module The embodiments described herein address these above-described constraints by providing a system which classifies data based on access frequency at the driver level. FIG. 2 illustrates an exemplary storage system 200 for facilitating data classification and storage, including a driver 210 with a statistics-updating module 212 and a frequency-sorting module 214, in accordance with an embodiment of the present application. Storage system 200 can evaluate data both from a host operation as well as background operations of the storage device. Storage system 200 can thus account for the actual write operations of all logical blocks.

Storage system 200 can include a host 202, an SSD controller 204, NAND dies 206, and a driver 210. Driver 210 can include: statistics-updating module 212; frequency-sorting module 214; an address-mapping module 218; and a garbage-collecting module 216. During operation, driver 210 can receive data both from host 202 (via a communication 232) and from SSD controller 204 (via a communication 250 to 232). The data is associated with a logical block address (LBA). The system can send the LBA to address-mapping module 218 (via a communication 234), which assigns the corresponding physical block address for the LBA and can also store the LBA and the corresponding PBA in a mapping table. The system can also send the LBA to statistics-updating module 212 (via communication 232), which can increment a counter of updates for the corresponding LBA in the mapping table.

At the same time, driver 210 is responsible for determining when to initiate garbage collection, such as by garbage-collecting module 216, which also results in data being written to NAND 206. Statistics-updating module 212 can thus provide to frequency-sorting module 214 (via a communication 236) a distribution of the data based on the counter for each LBA in the mapping table. The system can store the counter in an additional column in the mapping table, as described below in relation to FIG. 3.

Based on the distribution of data, frequency-sorting module 214 can sort or classify the data based on the access frequency (e.g., based on the dynamically updated counter in the mapping table). That is, the system can divide the data blocks into a plurality of categories or hotness groups to optimize the performance, efficiency, and lifespan of the SSD. The system can send the classification and categories corresponding to data to address-mapping module 218 (via a communication 238). Thus, address-mapping module 218 can make a future assignment based on the access frequency of data as classified into the categories. The system can use these mappings for subsequent access to NAND 206, including read, write, and erase operations (via a communication 244).

Thus, by classifying all write data (including from a host write and a background operation), the system can more accurately categorize and group the data to be written to a correspondingly assigned area of the non-volatile memory.

Exemplary Mapping Table

Figure 3:
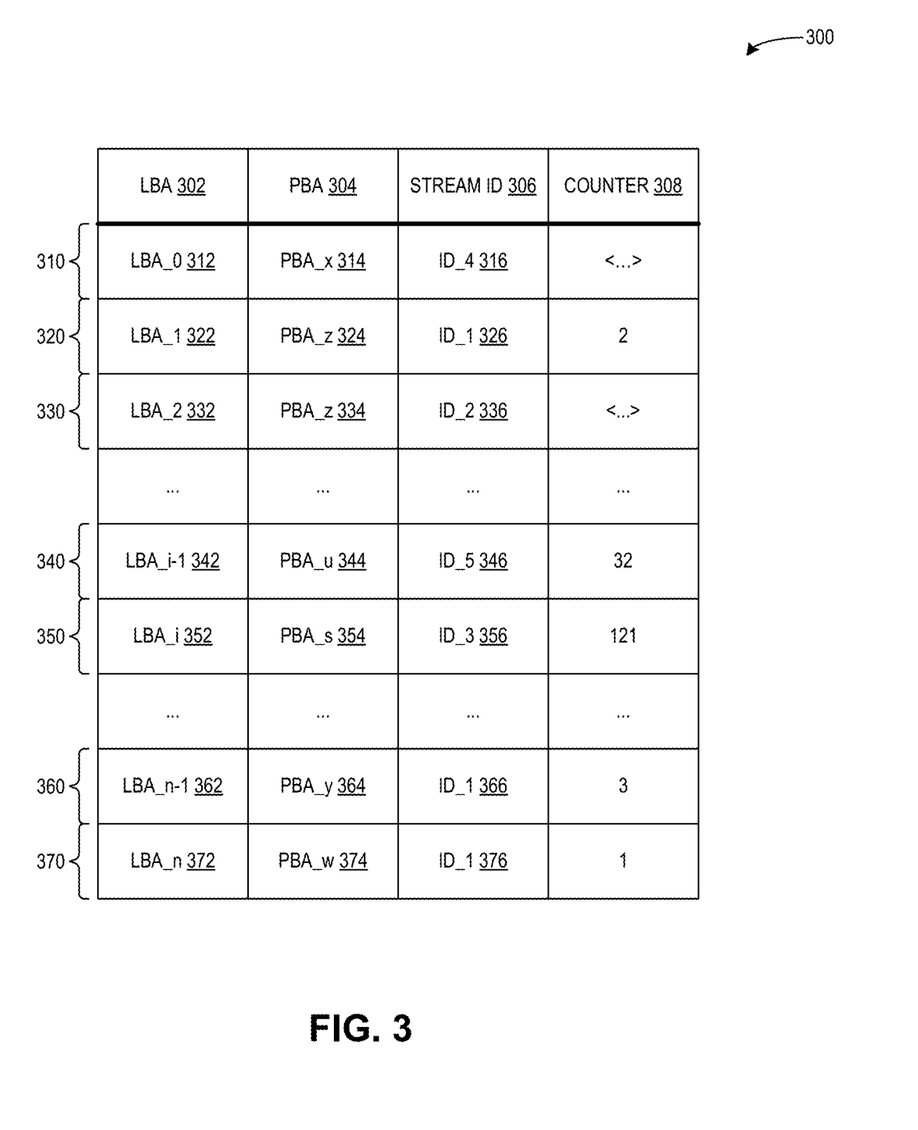
FIG. 3 illustrates an exemplary mapping table, in accordance with an embodiment of the present application.

FIG. 3 illustrates an exemplary mapping table 300, in accordance with an embodiment of the present application. Table 300 can include multiple entries 310, 320, 330, 340, 350, 360, and 370, where each entry can include the following fields: an LBA 302; a PBA 304; a stream identifier 306; and a counter 308. For example, entry 320 can include values for these fields: an LBA_1 322; a PBA_z 324; an ID_2 326; and a counter value of 2. The system can update counter 308 each time that the data corresponding to the LBA of the same entry is accessed. The access may be a read and/or a write operation. While the embodiments described herein refer to a write operation, the counter may also be based on a read operation. In addition, another counter may be included in table 300 (not shown), which can solely indicate the read count, while counter 308 can solely indicate the write count. Furthermore, the system can classify the data into categories based on a single counter, two or more counters, or any weighted combination of the two or more counters.

For example, the system may determine, based on counter 308, to classify data corresponding to entries 320, 360, and 370 as cold data (as their counters are all less than a predetermined number, such as 19), and assign these entries to a same stream identifier of "ID_1." The system may also determine to classify data corresponding to entry 340 as warm data (as its counter is between two predetermined numbers, such as 20 and 99), and assign entry 340 to a stream identifier of "ID_5." The system may also determine to classify data corresponding to entry 350 as hot data (as its counter is greater than a predetermined number, such as 100), and assign entry 350 to a stream identifier of "ID_3." Note that the three categories of hot, warm, and cold are used for exemplary purposes only. A smaller or larger number of categories may be used. Furthermore, the system can classify the data based on whether the counter is greater or less than a single predetermined threshold or number, or falls between two predetermined thresholds or numbers.

Thus, as the amount of stored data increases, driver 210 can accumulate the data updates and perform an increasingly accurate analysis, which can vary at different stages based on differing criteria. This can result in enhancing and optimizing the utilization efficiency of NAND flash.

Exemplary Distribution of Channels to Categories

Figure 4:
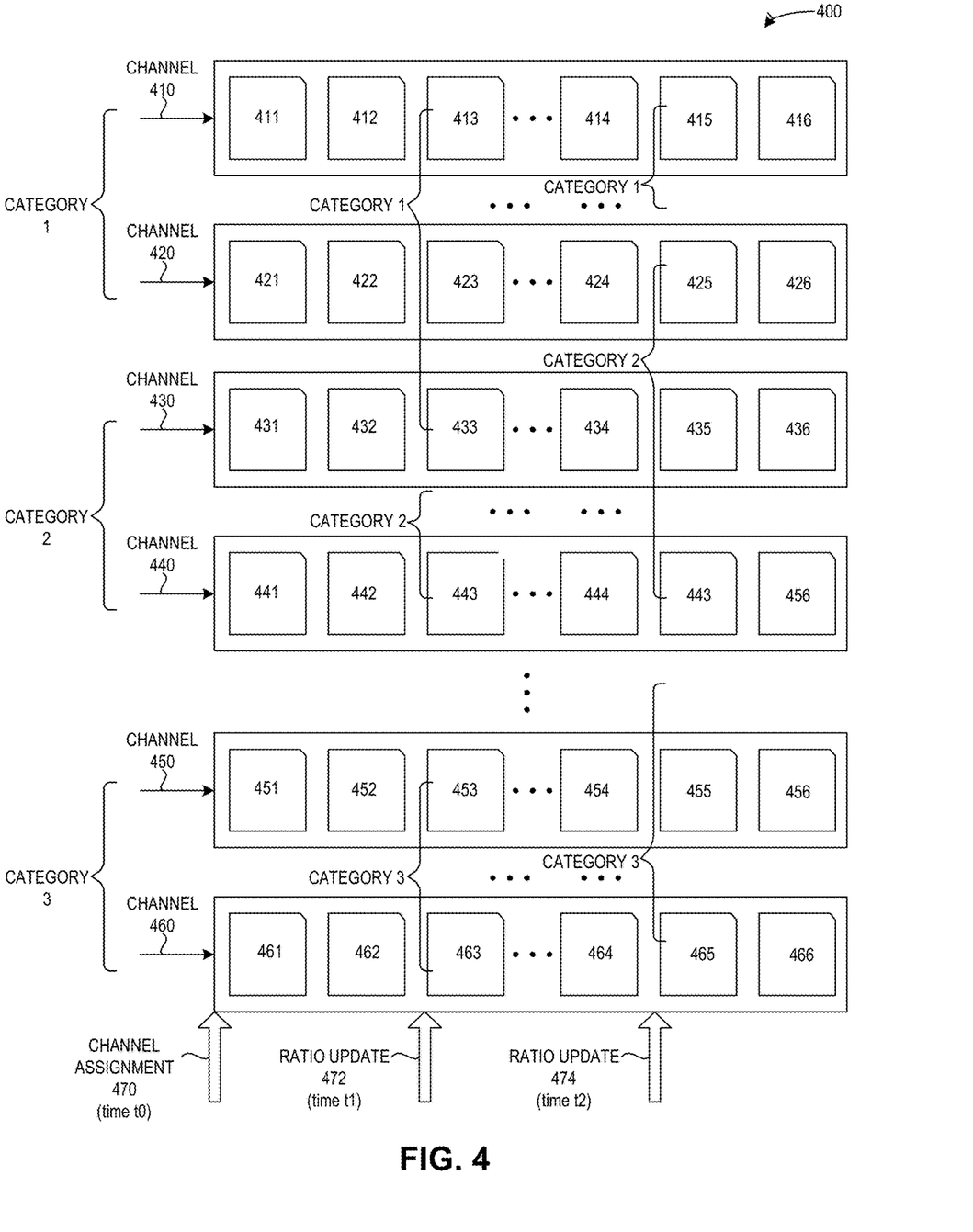
FIG. 4 illustrates an exemplary distribution of channels to categories, in accordance with an embodiment of the present application.

FIG. 4 illustrates an exemplary distribution of channels 410, 420, 430, 440, 450, and 460 to categories 1, 2, and 3, in accordance with an embodiment of the present application. The embodiments described herein can assign one or more channels to a category based on an amount of data in the category as compared to the data in the other categories which are spread across different channels, e.g., a ratio of the data amount. When the ratio (of an amount of data in a first category over a first number of channels compared to an amount of data in a second category over a second number of channels) changes, the system can perform a ratio update by adjusting the distribution of channels to categories.

For example, distribution 400 can indicate channels 410-460. The system can perform a channel assignment 470 at a time t0. The system can assign, based on information from the mapping table on stream identifiers and counters: category 1 to channels 410 and 420; category 2 to channels 430 and 440; and category 3 to channels 450 and 460.

The system can determine to perform a ratio update 472 at a time t1. This determination can be based on monitoring the ratio of the amount of data in each category compared to the overall data capacity of the drive. After ratio update 472, the system can dynamically distribute categories 1, 2, and 3 to a different set of channels, where at least one channel differs between at least two categories. For example, at time t1, the system can assign: category 1 to channels 410, 420, and 430; category 2 to channel 440; and category 3 to the same channels 450 and 460.

Subsequently, the system can adjust the distribution by updating a first configuration of channels to a second configuration of channels, wherein the first and second configurations differ by at least one channel. For example, the system can determine to perform a ratio update 474 at a time t2, and can dynamically adjust the distribution of channels to categories by assigning: category 1 to channel 410; category 2 to channels 420-440; and category 3 to at least channels 450 and 460.

Thus, distribution 400 depicts how the system can dynamically adjust the distribution of channels to categories, where the categories are based on a stream identifier and counter in the entries of the mapping table. This dynamic adjustment, along with the statistics accumulation and the frequency sorting, can provide an improvement in efficiency, performance, and lifespan of the NAND flash, the storage device, and the overall storage system.

Method for Facilitating Operation of a Storage System

Figure 5:
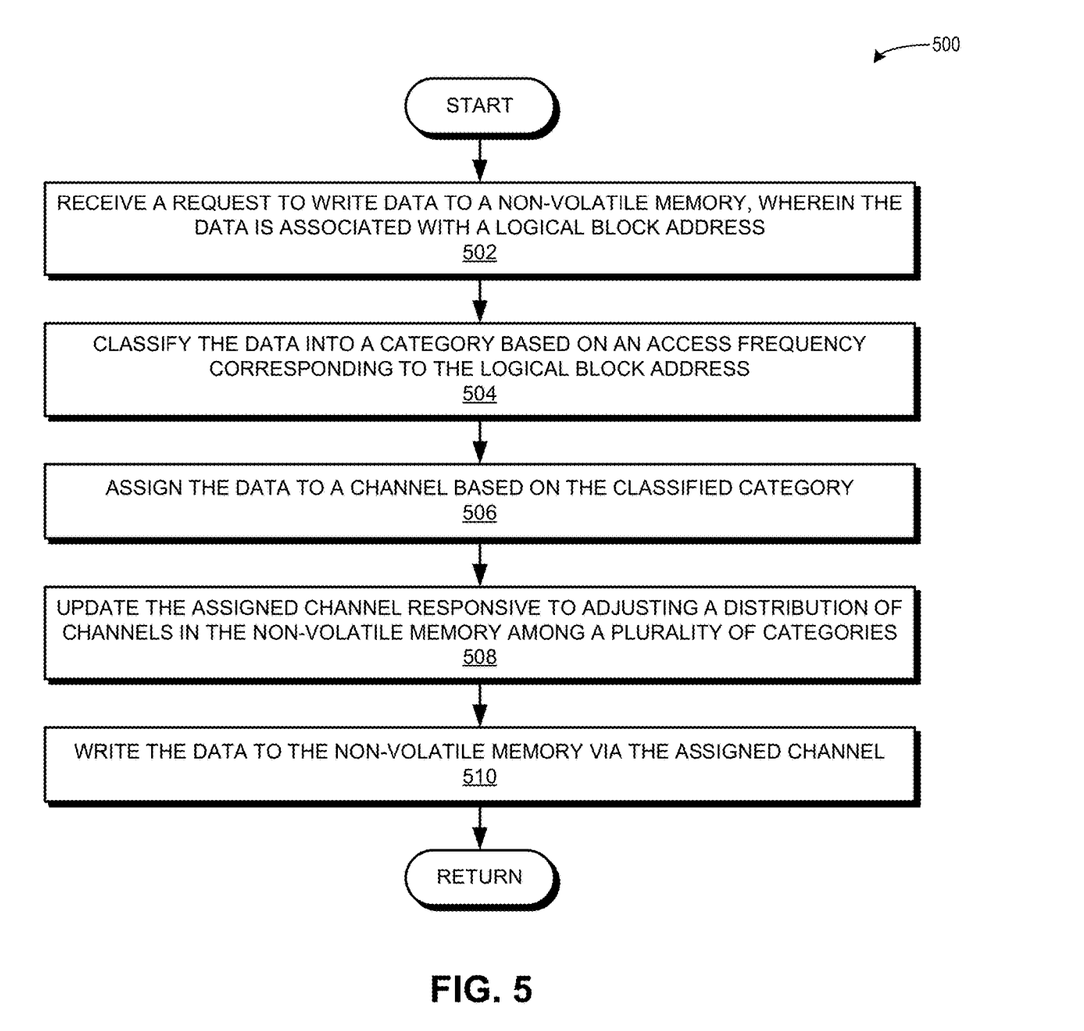
FIG. 5 presents a flowchart illustrating a method for facilitating operation of a storage system, in accordance with an embodiment of the present application.

FIG. 5 presents a flowchart 500 illustrating a method for facilitating operation of a storage system, in accordance with an embodiment of the present application. During operation, the system receives a request to write data to a non-volatile memory, wherein the data is associated with a logical block address (operation 502). The system classifies the data into a category based on an access frequency corresponding to the logical block address (operation 504). The system assigns the data to a channel based on the classified category (operation 506). The system updates the assigned channel responsive to adjusting a distribution of channels in the non-volatile memory among a plurality of categories (operation 508). The system writes the data to the non-volatile memory via the assigned channel (operation 510), and the operation returns.

Figure 6A:
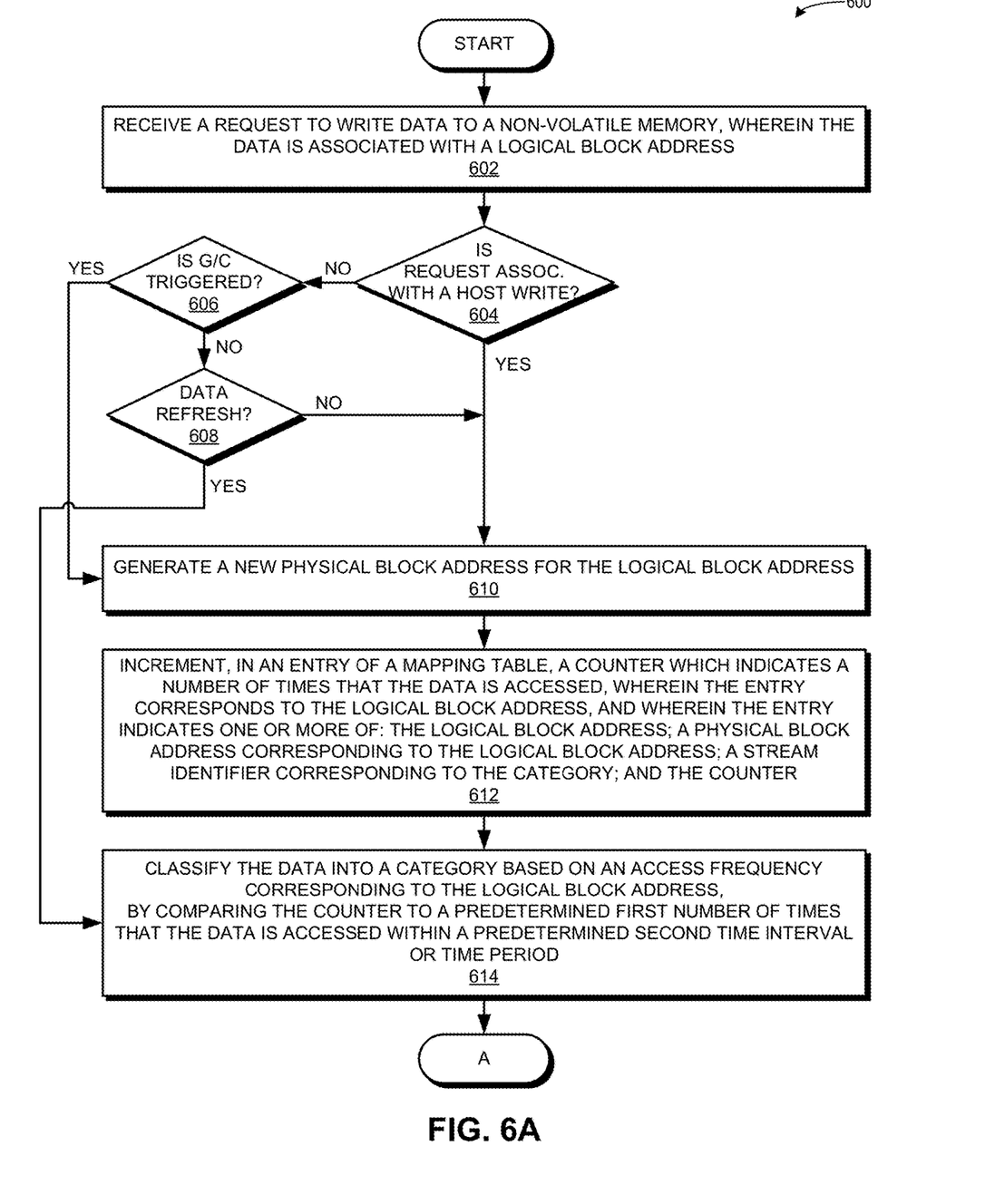
FIG. 6A presents a flowchart illustrating a method for facilitating operation of a storage system, in accordance with an embodiment of the present application.

FIG. 6A presents a flowchart 600 illustrating a method for facilitating operation of a storage system, in accordance with an embodiment of the present application. During operation, the system receives a request to write data to a non-volatile memory, wherein the data is associated with a logical block address (operation 502). If the request is associated with a host write, the operation continues at operation 610. If the request is not associated with a host write (decision 604), the system determines whether a garbage collection process is triggered (decision 606). If it is, the operation continues at operation 610.

If a garbage collection is not triggered (decision 606), the system determines whether the operation is associated with a data refresh (decision 608). If it is not, the operation continues at operation 610. If the operation is associated with a data refresh (decision 608), the operation continues at operation 614.

The system generates a new physical block address for the logical block address (operation 610). Next, the system increments, in an entry of mapping table, a counter which indicates a number of times that the data is accessed, wherein the entry corresponds to the logical block address, and wherein the entry indicates one or more of: the logical block address; a physical block address corresponding to the logical block address; a stream identifier corresponding to the category; and the counter (operation 612). The system classifies the data into a category based on an access frequency corresponding to the logical block address, by comparing the counter to a predetermined first number of times that the data is accessed within a predetermined second time interval or time period (operation 614). The operation continues at Label A of FIG. 6B.

Figure 6B:
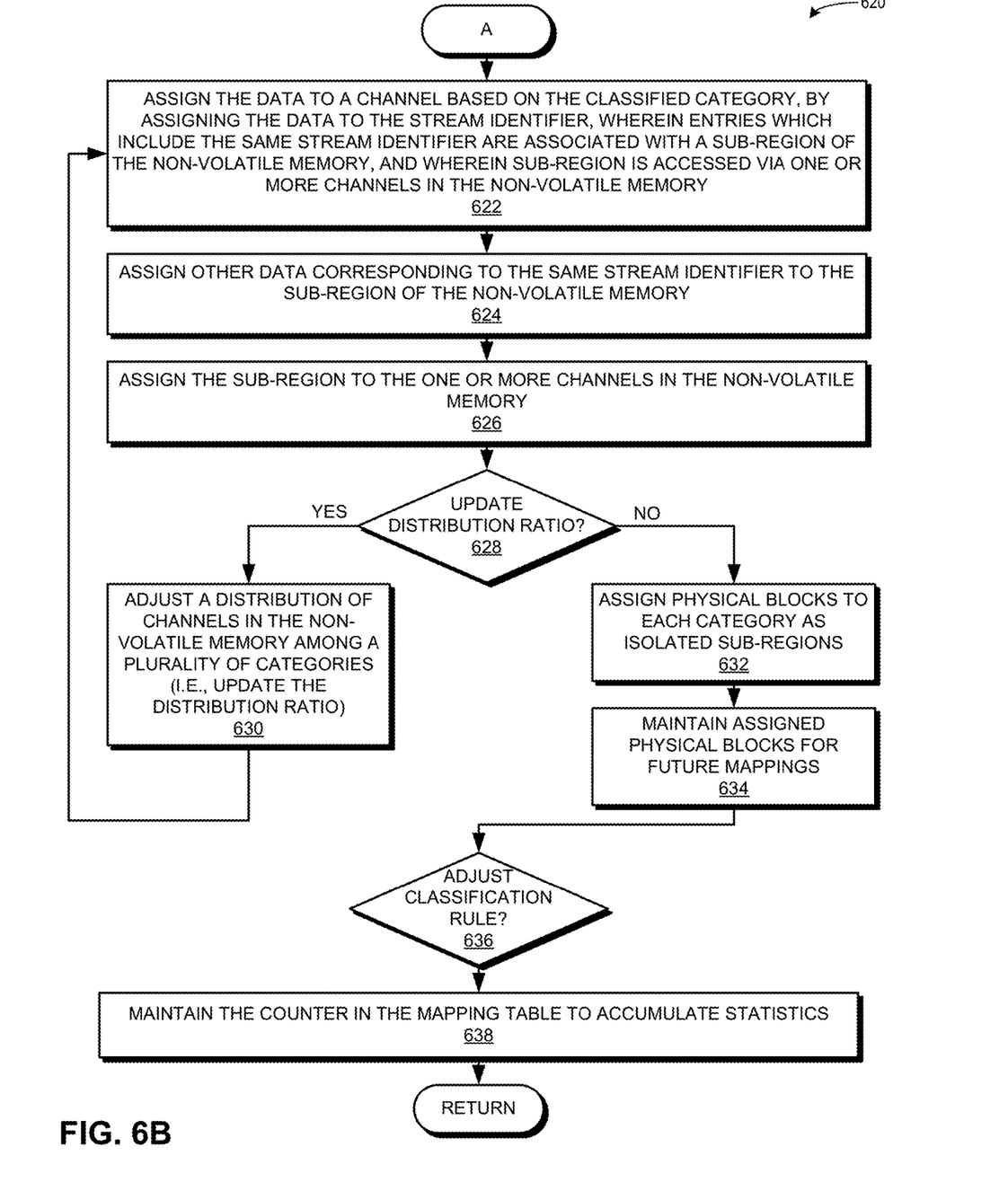
FIG. 6B presents a flowchart illustrating a method for facilitating operation of a storage system, in accordance with an embodiment of the present application.

FIG. 6B presents a flowchart 620 illustrating a method for facilitating operation of a storage system, in accordance with an embodiment of the present application. The system assigns the data to a channel based on the classified category, by assigning the data to the stream identifier, wherein entries which includes the same stream identifier are associated with a sub-region of the non-volatile memory, and wherein a sub-region is accessed via one or more channels in the non-volatile memory (operation 622). The system assigns other data corresponding to the same stream identifier to the sub-region of the non-volatile memory (operation 624), and also assigns the sub-region to the one or more channels in the non-volatile memory (operation 626).

The system determines whether to update the distribution ratio (decision 628). If it does, the system adjusts a distribution of channels in the non-volatile memory among a plurality of categories (operation 630). If the system determines not to update the distribution ratio (decision 628), the system assigns physical blocks to each category as isolated sub-regions (operation 632) and maintains the assigned physical blocks for future mappings (operation 634). The system then determines whether to adjust a classification rule (decision 636). The classification rule can be based on system or user-configured thresholds which determine a category to which to assign a certain access frequency, and can be adjusted automatically by the system as or configured by a user, including presenting a user interface to a system administrator. The system maintains the counter in the mapping table to accumulate statistics (operation 638), and the operation returns.

Exemplary Computer System and Apparatus

Figure 7:
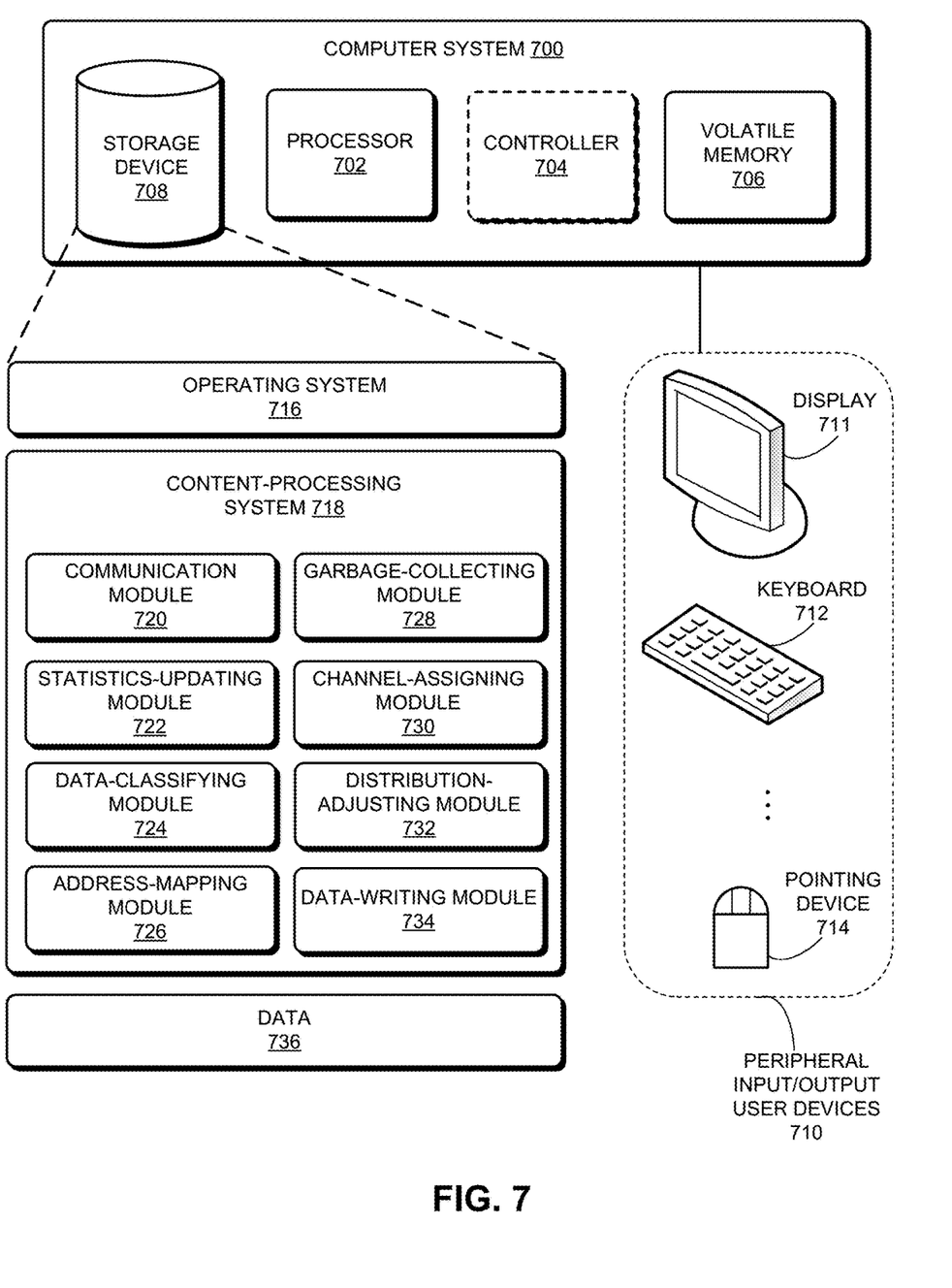
FIG. 7 illustrates an exemplary computer system that facilitates operation of a storage system, in accordance with an embodiment of the present application.

FIG. 7 illustrates an exemplary computer system that facilitates operation of a storage system, in accordance with an embodiment of the present application. Computer system 700 includes a processor 702, a volatile memory 706, and a storage device 708. In some embodiments, computer system 700 can include a controller 704 (indicated by the dashed lines). Volatile memory 706 can include, e.g., random access memory (RAM), that serves as a managed memory, and can be used to store one or more memory pools. Storage device 708 can include persistent storage which can be managed or accessed via processor 702 (or controller 704). Furthermore, computer system 700 can be coupled to peripheral input/output (I/O) user devices 710, e.g., a display device 711, a keyboard 712, and a pointing device 714. Storage device 708 can store an operating system 716, a content-processing system 718, and data 736.

Content-processing system 718 can include instructions, which when executed by computer system 700, can cause computer system 700 or processor 702 to perform methods and/or processes described in this disclosure. Specifically, content-processing system 718 can include instructions for receiving and transmitting data packets, including data to be read or written and an input/output (I/O) request (e.g., a read request or a write request) (communication module 720).

Content-processing system 718 can further include instructions for receiving a request to write data to a non-volatile memory, wherein the data is associated with a logical block address (communication module 720). Content-processing system 718 can further include instructions for updating a mapping table entry for the data based on the LBA, with a PBA, a stream identifier, and a counter (address-mapping module 726). Content-processing system 718 can further include instructions for classifying the data into a category based on an access frequency corresponding to the logical block address (data-classifying module 724). Content-processing system 718 can further include instructions for assigning the data to a channel based on the classified category (channel-assigning module 730). Content-processing system 718 can further include instructions for updating the assigned channel responsive to adjusting a distribution of channels in the non-volatile memory among a plurality of categories (distribution-adjusting module 732 and channel-assigning module 730). Content-processing system 718 can further include instructions for writing the data to the non-volatile memory via the assigned channel (data-writing module 734). Content-processing system 718 can further include instructions for performing a garbage collection operation (garbage-collecting module 728).

Data 736 can include any data that is required as input or generated as output by the methods and/or processes described in this disclosure. Specifically, data 736 can store at least: data; a request; a read request; a write request; an input/output (I/O) request; data or metadata associated with a read request, a write request, or an I/O request; a logical block address (LBA); a physical block address (PBA); a stream identifier; a counter; a category; a hotness group; a predetermined time interval or time period; a table; a mapping table; an entry; an indicator of an access frequency; an indicator of access associated with a read or a write operation; a value of the counter; an indicator of a sub-region of a non-volatile memory; a number; a number of updates to data; an amount of data; an amount of data associated with one or more channels; a configuration of channels; and an indicator of whether a request is received from a host or is triggered by a background operation.

Figure 8:
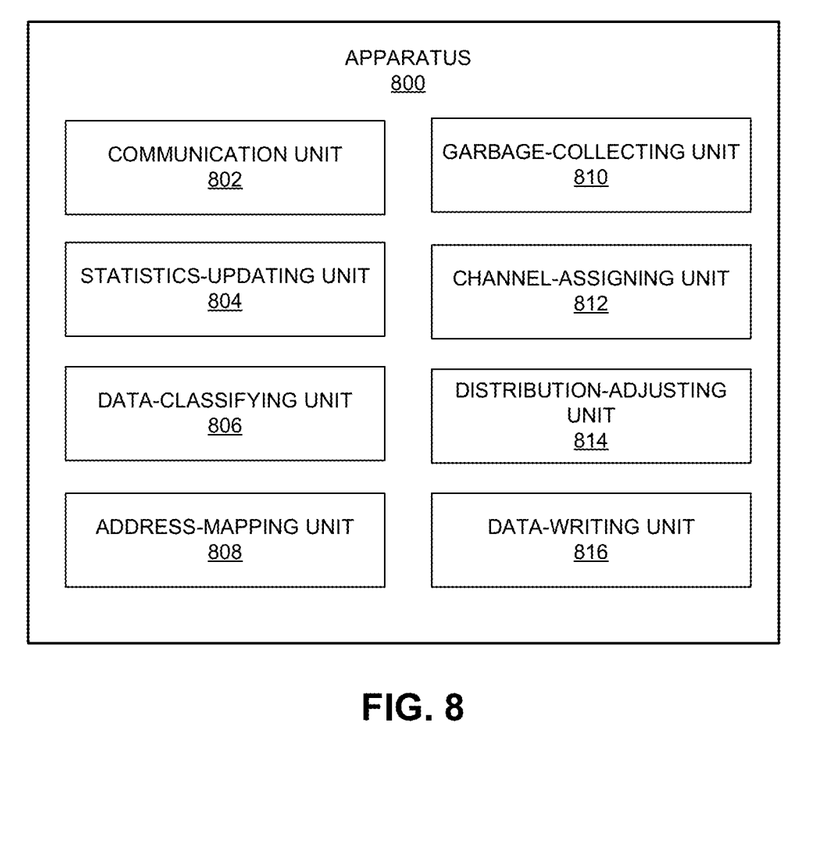
FIG. 8 illustrates an exemplary apparatus that facilitates operation of a storage system, in accordance with an embodiment of the present application.

FIG. 8 illustrates an exemplary apparatus 800 that facilitates operation of a storage system, in accordance with an embodiment of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Furthermore, apparatus 800 may be integrated in a computer system, or realized as a separate device or devices capable of communicating with other computer systems and/or devices.

Apparatus 800 can comprise modules or units 802-816 which are configured to perform functions or operations similar to modules 720-734 of computer system 700 of FIG. 7, including: a communication unit 802; a statistics-updating unit 804; a data-classifying unit 806; an address-mapping unit 808; a garbage-collecting unit 810; a channel-assigning unit 812; a distribution-adjusting unit 814; and a data-writing unit 816.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
   receiving a request to write data to a non-volatile memory, wherein the data is associated with a logical block address;
   obtaining, from a first search in a mapping table based on the logical block address, an entry which maps the logical block address to a physical block address, a stream identifier, a first counter which indicates a number of times that the entry is accessed for a write operation, and a second counter which indicates a number of times that the entry is accessed for a read operation;
   incrementing, in the obtained entry of the mapping table, the first counter;
   classifying the data into a category of a plurality of categories based on a weighted combination of a current value of the first counter and a current value of the second counter;
   assigning the data to a channel based on the classified category;
   writing the data to the non-volatile memory via the assigned channel;
   monitoring a ratio of an amount of data assigned to a respective channel of a plurality of channels based on a respective classified category compared to an overall data capacity of the non-volatile memory; and
   performing, based on the monitored ratio, a ratio update by adjusting a distribution of channels in the non-volatile memory among the plurality of categories, which involves:
   updating a first configuration of channels to a second configuration of channels,
   wherein the first configuration of channels indicates an assignment of a first set of one or more channels to a first category,
   wherein the second configuration of channels indicates an assignment of a second set of one or more channels to the first category, and
   wherein the first set and the second set differ by at least one channel.

2. The method of claim 1,
   wherein the stream identifier corresponds to the category.

3. The method of claim 2,
   wherein a plurality of entries in the mapping table include a same stream identifier,
   wherein the entries which include the same stream identifier are associated with a sub-region of the non-volatile memory, and
   wherein the sub-region is accessed via one or more channels in the non-volatile memory.

4. The method of claim 3, wherein assigning the data to the channel based on the classified category comprises:
   assigning the data to the stream identifier;
   wherein the method further comprises:
   assigning other data corresponding to the same stream identifier to the sub-region of the non-volatile memory; and
   assigning the sub-region to the one or more channels in the non-volatile memory.

5. The method of claim 1, wherein classifying the data into the category is further based on:
   comparing the first or second counter to a predetermined first number of times that the data is accessed within a first predetermined time interval or time period.

6. The method of claim 1, further comprising incrementing the second counter which indicates the number of times that the entry is accessed for a read operation, by:
   receiving a request to read the data from the non-volatile memory, wherein the data is associated with the logical block address;

obtaining, from a second search in a mapping table based on the logical block address, the entry which maps the logical block address to the physical block address, the stream identifier, the first counter which indicates a number of times that the entry is accessed for a write operation, and the second counter which indicates a number of times that the entry is accessed for a read operation; and incrementing, in the obtained entry of the mapping table, the second counter.

7. The method of claim 1,
wherein a respective category is associated with one of a plurality of predetermined access frequencies.

8. The method of claim 1, wherein performing the ratio update by adjusting the distribution of channels in the non-volatile memory among the plurality of categories is further based on:
an amount of throughput available on the respective channel or the channels; and
an amount of throughput required by data currently assigned to one or more channels.

9. The method of claim 1, wherein the request is received from a host or is triggered by a background operation.

10. A computer system, comprising:
a processor; and
a memory coupled to the processor and storing instructions which, when executed by the processor, cause the processor to perform a method, the method comprising:
receiving a request to write data to a non-volatile memory, wherein the data is associated with a logical block address;
obtaining, from a first search in a mapping table based on the logical block address, an entry which maps the logical block address to a physical block address, a stream identifier, a first counter which indicates a number of times that the entry is accessed for a write operation, and a second counter which indicates a number of times that the entry is accessed for a read operation;
incrementing, in the obtained entry of the mapping table, the first counter;
classifying the data into a category of a plurality of categories based on a weighted combination of a current value of the first counter and a current value of the second counter;
assigning the data to a channel based on the classified category;
writing the data to the non-volatile memory via the assigned channel;
monitoring a ratio of an amount of data assigned to a respective channel of a plurality of channels based on a respective classified category compared to an overall data capacity of the non-volatile memory; and
performing, based on the monitored ratio, a ratio update by adjusting a distribution of channels in the non-volatile memory among the plurality of categories, which involves:
updating a first configuration of channels to a second configuration of channels,
wherein the first configuration of channels indicates an assignment of a first set of one or more channels to a first category,
wherein the second configuration of channels indicates an assignment of a second set of one or more channels to the first category, and
wherein the first set and the second set differ by at least one channel.

11. The computer system of claim 10,
wherein the stream identifier corresponds to the category.

12. The computer system of claim 11, wherein assigning the data to the channel based on the classified category comprises:
assigning the data to the stream identifier;
wherein the method further comprises:
assigning the data and other data corresponding to the same stream identifier to a sub-region of the non-volatile memory; and
assigning the sub-region to one or more channels in the non-volatile memory.

13. The computer system of claim 10, wherein the request is received from a host or is triggered by a background operation.

14. An apparatus, comprising:
a controller;
a non-volatile memory; and
a driver which comprises a communication module, an address-mapping module, a data-classifying module, a channel-assigning module, a data-writing module, and a distribution-adjusting module;
wherein the communication module is configured to receive a request to write data to a non-volatile memory, wherein the data is associated with a logical block address;
wherein the address-mapping module is configured to:
obtain, from a first search in a mapping table based on the logical block address, an entry which maps the logical block address to a physical block address, a stream identifier, a first counter which indicates a number of times that the entry is accessed for a write operation, and a second counter which indicates a number of times that the entry is accessed for a read operation; and
increment, in the obtained entry of the mapping table, the first counter;
wherein the data-classifying module is configured to classify the data into a category of a plurality of categories based on a weighted combination of a current value of the first counter and a current value of the second counter;
wherein the channel-assigning module is configured to assign the data to a channel based on the classified category;
wherein the data-writing module is configured to write the data to the non-volatile memory via the assigned channel; and
wherein the distribution-adjusting module is configured to:
monitor a ratio of an amount of data assigned to a respective channel of a plurality of channels based on a respective classified category compared to an overall data capacity of the non-volatile memory; and
perform, based on the monitored ratio, a ratio update by adjusting a distribution of channels in the non-volatile memory among a plurality of categories,
wherein the channel-adjusting module is configured to update a first configuration of channels to a second configuration of channels,
wherein the first configuration of channels indicates an assignment of a first set of one or more channels to a first category,
wherein the second configuration of channels indicates an assignment of a second set of one or more channels to the first category, and wherein the first set and the second set differ by at least one channel.

15. The apparatus of claim 14,
wherein the channel-adjusting module updating the first configuration of channels to the second configuration of channels is based on one or more of:
   an amount of throughput available on the respective channel or the channels; and
   an amount of throughput required by data currently assigned to one or more channels.

16. The computer system of claim 10, wherein the method further comprises incrementing the second counter which indicates the number of times that the entry is accessed for a read operation, by:
   receiving a request to read the data from the non-volatile memory, wherein the data is associated with the logical block address;
   obtaining, from a second search in a mapping table based on the logical block address, the entry which maps the logical block address to the physical block address, the stream identifier, the first counter which indicates a number of times that the entry is accessed for a write operation, and the second counter which indicates a number of times that the entry is accessed for a read operation; and
   incrementing, in the obtained entry of the mapping table, the second counter.

17. The computer system of claim 10,
wherein a respective category is associated with one of a plurality of predetermined access frequencies.

18. The computer system of claim 17, wherein performing the ratio update by adjusting the distribution of channels in the non-volatile memory among the plurality of categories is further based on:
   an amount of throughput available on the respective channel or the channels; and
   an amount of throughput required by data currently assigned to one or more channels.

19. The apparatus of claim 14, wherein the address-mapping module is further configured to increment the second counter which indicates the number of times that the entry is accessed for a read operation, by:
   receiving a request to read the data from the non-volatile memory, wherein the data is associated with the logical block address;
   obtaining, from a second search in a mapping table based on the logical block address, the entry which maps the logical block address to the physical block address, the stream identifier, the first counter which indicates a number of times that the entry is accessed for a write operation, and the second counter which indicates a number of times that the entry is accessed for a read operation; and
   incrementing, in the obtained entry of the mapping table, the second counter.

\* \* \* \* \*